Nov. 8, 1966      H. B. HORTON      3,283,766

SEPARABLE FLUID CONTROL SYSTEM

Filed April 22, 1963

INVENTOR
HAROLD B. HORTON
BY *Griffin and Stokes*
ATTORNEYS 3,283,766
SEPARABLE FLUID CONTROL SYSTEM
Harold B. Horton, New Canaan, Conn., assignor to Sperry-Rand Corporation, New York, N.Y., a corporation of Delaware
Filed Apr. 22, 1963, Ser. No. 274,666
4 Claims. (Cl. 137—81.5)

This invention relates to the art of fluid control, and is particularly concerned with the deflection of a fluid stream into one or more output channels by the distortion of the walls of an input fluid stream channel.

In the field of pure fluid amplifiers, where the present invention finds particular although not exclusive use, a fluid power jet stream of relatively high energy which emerges into an interaction chamber may be deflected without losing its integrity by the impingement of a fluid control stream of relatively smaller energy at substantially right angles thereto. In most such prior art devices, two output channels branch from the interaction chamber so that deflection of the power stream will cause an unequal division of fluid flow in said output channels. The deflection of the power stream can be made proportional to the energy of the impinging control stream. On the other hand, a pure fluid amplifier may be made bistable in order to provide a step function output. In all of these prior art fluid amplifiers, however, there is a physical intermixing of the power stream and control stream fluids within the interaction chamber. Where both said fluids are alike, as is customarily the case when the power stream output of one fluid amplifier is utilized as the control stream input to a succeeding fluid amplifier, there is no disadvantage in intermixing the fluids. On the other hand, there are many applications where a power stream, comprised of one type of fluid, must be deflected between output channels by the pressure of an unlike control fluid. Examples of such applications are the following: (1) A fluid logic system using helium or hydrogen gas (for speed) to control pneumatic circuits; (2) A pneumatic or other gas-operated computer as part of a process control system for controlling the flow of liquids or toxic gases; (3) Control of radioactive fluids by means of non-radioactive fluids. The present invention provides a device to permit one fluid to control the deflection of another without intermixing and without use of valves, pistons, or other complex mechanical parts. In particular, a deformable conduit fixedly secured at both ends is used to apply the power stream fluid of a pure fluid amplifier to the inlets of several output channels. The control fluid has its pressure applied to the exterior of the deformable conduit in order to flex same to thereby alter the path of the power fluid as it approaches said inlets. By varying the degree and polarity of the control pressure across the conduit, said conduit is caused to bend so as to deflect the power stream and thus vary power stream flow in the output channels.

It is therefore an object of the present invention to provide fluid device permitting control of one fluid by another without intermixing the two, and without use of mechanical valve parts.

A further object of the present invention is to provide a pure fluid amplifier wherein a fluid power stream can be deflected, without losing its integrity, by deforming walls of its input channel.

Another object of the invention is to provide amplification of a fluid control signal in a device that transfers said signal without intermixing to a second fluid of relatively higher energy.

These and other objects of the invention will become apparent during the course of the following description, which is to be read in view of the drawings, in which.

Figure 1A:
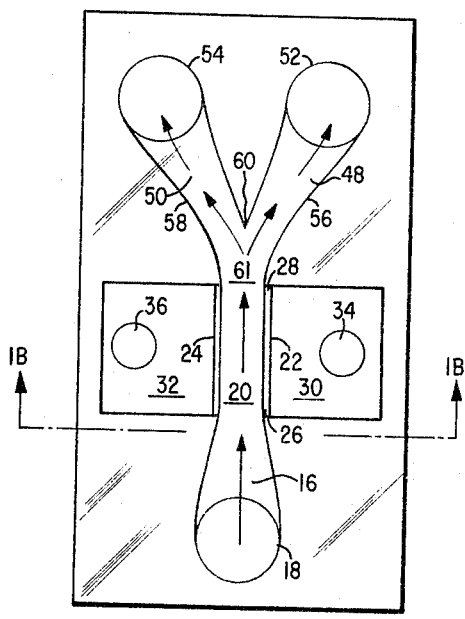
FIGURES 1a and 1b show plan and end elevation views, respectively of one embodiment of the present invention which generates an output proportional to the input control signal.
Figure 1B:
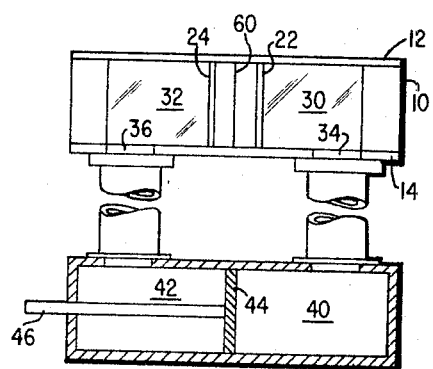

FIGURE 1 shows one embodiment of the present invention whereby a pure fluid amplifier is modified to prevent intermixing of the power stream and control stream fluids. A center body 10 of plastic or the like has formed therein a plurality of fluid channels which extend through the thickness of body 10. Top and bottom cover plates 12 and 14, respectively, are fastened to block 10 in order to form the top and bottom walls of said channels, respectively. A fluid power stream input channel 16 is connected to an external source of fluid (not shown) by means of an inlet port 18 entering at right angles through the bottom cover plate 14. Power stream channel 16 narrows to a nozzle configuration 20 whose side walls are formed by elastic, deformable diaphragms 22 and 24 which extend through the thickness of body 10. Diaphragms 22 and 24 are fixedly secured at both their upstream and downstream ends 26 and 28, respectively. Nozzle 20 of the power stream input channel is therefore of rectangular cross-sectional area whose top and bottom wall surfaces are defined by the inner surfaces of cover plates 12 and 14, respectively, and whose side wall surfaces are defined by the inner surfaces of diaphragms 22 and 24. Each of these diaphragms is deformable in that a pressure differential existing across its major surfaces will cause its unsupported center to curve or bend in the direction of least pressure. Such pressure differential is applied across each of the diaphragms by the provision of a control fluid pressure chamber 30 and 32 individual to each diaphragm 22 and 24, respectively, and adjacent their external surfaces. Each chamber 30 and 32 communicates via respective ports 34 and 36, with variable sources of pressure either static, dynamic, or a combination thereof. A typical external static source is that shown in FIGURE 1b which comprises a cylinder 38 divided into two variable volumes 40 and 42 by the sliding piston 44. A rod 46 may be provided to actuate piston 44 in either direction in order to increase volume 40 while decreasing volume 42, or vice versa. Volumes 40 and 42 are isolated one from the other by piston 44, and it is assumed that chambers 30 and 32 are also isolated one from the other and from nozzle 20 by virtue of suitable seals surrounding diaphragms 22 and 24.

Two power stream output channels 48 and 50 complete the embodiment of FIGURE 1. Each output channel branches downstream from nozzle 20 to thereby exit through ports 52 and 54, respectively, to utilization devices not shown in FIGURE 1. The outer side walls 56 and 58 are unabruptly joined with ends 28 of nozzle 20, while the inner side walls of the output channels are joined together at a divider knife edge 60 which may be located downstream from and on the normal flow axis of nozzle 20. A free space region or chamber 61 thereby separates the inlets of channels 48 and 50 from the outlet of nozzle 20. In prior art pure fluid amplifiers, the control streams usually enter this region to impinge upon the power stream in order to deflect it into one of the output channels. However, power stream deflection in the present invention is performed by diaphragms 22 and 24 as will next be desribed.

Figure 2A:
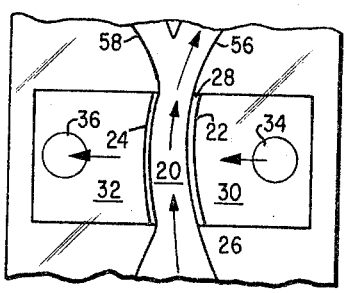
FIGURES 2a and 2b illustrate the operation of the embodiment in FIGURE 1.
Figure 2B:
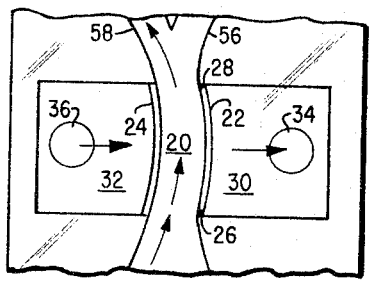

The operation of the invention will now be described with particular reference to FIGURES 2a and 2b, as well as to FIGURES 1a and 1b. If volumes 40 and 42, and chambers 30 and 32 are filled with an incompressible liquid, or with a gas whose pressure increases with the decreasing volume, then there is a center position of piston 44 whereby the pressures external to diaphragms 22 and 24 equal to the power stream pressure existing in nozzle 20. For this situation, as illustrated in FIGURE 1a, neither diaphragm 22 or 24 is deformed so that the power stream divides evenly into output channels 48 and 50. By now moving piston 44 toward the right, the fluid pressure in chamber 40 increases thus increasing the fluid pressure in chamber 30 to a value greater than the power stream pressure in nozzle 20. At the same time, volume 42 increases which consequently decreases the pressure in chamber 32 below the power stream pressure existing in nozzle 20. Diaphragms 22 and 24 are therefore deformed in the manner shown by FIGURE 2a so that the power stream undergoes a change in its direction of flow as it passes through nozzle 20. Upon emerging from nozzle 20, said power stream follows a path in region 61 which causes the majority of its particles, if not all, to enter output channel 48. The pressure differential existing across diaphragms 22 and 24 may be made great enough so that the power stream undergoes sufficient deflection in nozzle 20 to flow completely through output channel 48. If piston 44 is now moved to the left of its center position, the consequent increase in pressure on the external surface of diaphragm 24 and the decrease in pressure on the external surface of diaphragm 22 causes said diaphragms to bend in the manner shown by FIGURE 2b in order to deflect more of the power stream into output channel 50. Of course, fluid amplifier devices may be employed to bring about changes of pressure of the diaphragms. This arrangement, not illustrated, would eliminate the need for the piston 44 or other moving parts.

Figure 3:
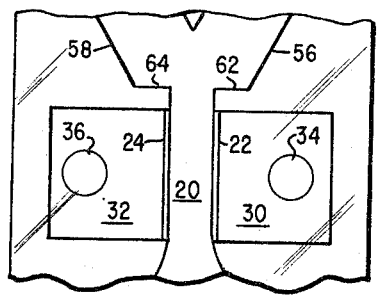
FIGURE 3 shows an alternative embodiment of the invention wherein bistable operation occurs.

FIGURE 3 represents a slight modification of the embodiment of FIGURE 1 wherein a bistable characteristic is provided, whereby the fluid power stream remains flowing in the output channel to which it is directed even after diaphragms 22 and 24 return to their unflexed condition. Although there are several different techniques for providing such multistable operation, the amplifier in FIGURE 3 is assumed to employ the so-called boundary layer effect. Since this phenomenon is well known to the pure fluid amplifier art, no further details need be given here. The creation and maintenance of a boundary layer can be enhanced by slightly offsetting the outer walls 56 and 58 of the output channels with respect to the outlet of nozzle 20, these offset regions being generally indicated at 62 and 64. Thus, the FIGURE 3 device has the following operation. If the diaphragms are deflected as shown in FIGURE 2a, the power stream is deflected into output channel 48 whereupon it locks on to the outer wall 56 because of the boundary layer effect. Even if diaphragms 22 and 24 are now returned to the position shown in FIGURE 1a, the power stream remains flowing completely in output channel 48. In order to switch power stream flow from output channel 48 into output channel 50, it is now necessary to temporarily deform the diaphragms in the direction shown in FIGURE 2b in order to overcome the locking effect along wall 56. If this is done, the power stream now flows exclusively through output channel 50 even though the diaphragms are subsequently returned to their neutral position shown in FIGURE 1a. Consequently, the embodiment of FIGURE 3 displays a bistable characteristic with switching being performed by the polarity of the diaphragm deformation.

While several embodiments of the invention have been shown and/or described, it is apparent that various modifications may be made thereto without departing from the novel principles defined in the appended claims.

I claim:
1. A fluid device which comprises:
 (a) a fluid stream input channel having at least two opposed inner wall surfaces each capable of being selectively deformed concave and convex with respect to the interior of said input channel between fixedly secured upstream and downstream ends thereof, with said inner wall surface downstream ends defining an outlet from said input channel;
 (b) a plurality of fluid stream output channels for collecting said fluid stream as it issues from said outlet having inlets fixedly secured downstream from said outlet and separated therefrom and from each other by a free space region through which the fluid stream flows; and
 (c) selectively operable means concurrently deforming one of said inner wall surfaces concavely and deforming the other inner wall surface convexly so that said inner wall surfaces simultaneously cooperate to form a curved channel to enable directing of the fluid stream into one of said output channels.

2. A fluid device according to claim 1 wherein each said opposed deformable wall comprises an elastic diaphragm.

3. The device of claim 2 wherein said selectively operable means comprises means for concurrently lowering pressure on one side of one of said elastic diaphragms while raising pressure on one side of the other diaphragm.

4. A pure fluid amplifier which compirses:
 (a) a fluid power stream input channel having two opposed walls comprised of elastic diaphragms which simultaneously cooperate and which are responsive to the application of fluid pressure to their external surfaces for being temporarily deformed between fixedly secured upstream and downstream ends thereof in a manner to vary the direction of power stream flow therebetween;
 (b) a chamber into which said secured diaphragm downstream ends terminate;
 (c) two power stream output channels connected to and branching from said chamber for receiving said power stream;
 (d) an individual control chamber adjacent to the external surface of each said diaphragm, each said control chamber containing fluid under pressure; and
 (e) means to selectively and concurrently increase the fluid pressure in one of said control chambers and decrease the fluid pressure in the other said control chamber, or vice versa, in order to cause a substantially parallel deformation of said opposed diaphragms in one transverse direction or the other so as to form a curved channel of varying curvature as determined by the amount of parallel deformation so as to increase power stream flow in one or the other of said output channels.

References Cited by the Examiner

UNITED STATES PATENTS

| | | | |
|---|---|---|---|
| 2,624,364 | 1/1953 | Detlefsen | 137—81.5 X |
| 2,898,078 | 8/1959 | Stephenson et al. | 251—61 X |
| 3,078,675 | 2/1963 | Baldwin | 137—81.5 X |
| 3,144,037 | 8/1964 | Cargill et al. | 137—81.5 |
| 3,148,691 | 9/1964 | Greenblott | 137—81.5 |

FOREIGN PATENTS 1,083,607 6/1960 Germany.

M. CARY NELSON, *Primary Examiner.*
LAVERNE D. GEIGER, *Examiner.*
S. SCOTT, *Assistant Examiner.*